(12) United States Patent
Liu

(10) Patent No.: US 12,443,295 B2
(45) Date of Patent: Oct. 14, 2025

(54) SUPPORT ASSEMBLY, TOUCHPAD, AND ELECTRONIC DEVICE

(71) Applicant: SHENZHEN GOODIX TECHNOLOGY CO., LTD., Shenzhen (CN)

(72) Inventor: Xiangying Liu, Shenzhen (CN)

(73) Assignee: SHENZHEN GOODIX TECHNOLOGY CO., LTD. (CN)

( * ) Notice: Subject to any disclaimer, the term of this patent is extended or adjusted under 35 U.S.C. 154(b) by 0 days.

(21) Appl. No.: 18/650,272

(22) Filed: Apr. 30, 2024

(65) Prior Publication Data
US 2024/0288957 A1 Aug. 29, 2024

Related U.S. Application Data

(63) Continuation of application No. 18/074,909, filed on Dec. 5, 2022, now Pat. No. 12,013,993, which is a
(Continued)

(51) Int. Cl.
| | | |
|---|---|---|
| *G06F 3/033* | (2013.01) | |
| *G06F 1/16* | (2006.01) | |
| *G06F 3/0354* | (2013.01) | |

(52) U.S. Cl.
CPC .......... *G06F 3/03547* (2013.01); *G06F 1/169* (2013.01)

(58) Field of Classification Search
CPC ...... G06F 1/169; G06F 3/033; G06F 3/03547; G06F 3/041; G06F 2203/04101; G06F 2203/04102; G06F 2203/04105
See application file for complete search history.

(56) References Cited

U.S. PATENT DOCUMENTS

| | | |
|---|---|---|
| 7,960,663 B2 | 6/2011 | Yoshihiro |
| 8,829,378 B2 | 9/2014 | Villain |

(Continued)

FOREIGN PATENT DOCUMENTS

| | | |
|---|---|---|
| CN | 1945507 A | 4/2007 |
| CN | 103809684 A | 5/2014 |

(Continued)

OTHER PUBLICATIONS

International Search Report of PCT/CN2022/094326 issued on Feb. 6, 2023.
(Continued)

*Primary Examiner* — Joe H Cheng
(74) *Attorney, Agent, or Firm* — Emerson, Thomson, & Bennett, LLC; Roger D. Emerson; Matt J. Wilson

(57) ABSTRACT

A touchpad includes a touch assembly and a support assembly. The touch assembly is disposed on the support assembly. The support assembly includes: a main support component, disposed at an edge of a bottom surface of the touch assembly; a fixed platform, on which a boss is integrally formed; and first and second elastic components, where the first and second elastic components are symmetrically connected to the main support component along a plane in which the main support component is located, an opening for accommodating the fixed platform is formed between the first and second elastic components, the fixed platform is connected between the first and second elastic components, and the support assembly has a sheet-like structure; and a travel switch is disposed on the bottom surface of the touch assembly, and the boss is configured to touch and trigger the travel switch when the touch assembly is pressed.

20 Claims, 9 Drawing Sheets

Related U.S. Application Data continuation of application No. PCT/CN2022/094326, filed on May 23, 2022.

(56) References Cited

U.S. PATENT DOCUMENTS

| | | |
|---|---|---|
| 8,964,378 B2 | 2/2015 | Kao et al. |
| 9,292,051 B2 | 3/2016 | Takata |
| 9,465,416 B2 | 10/2016 | Shen et al. |
| 10,261,550 B2 | 4/2019 | Huang |
| 10,459,542 B1 | 10/2019 | Costante et al. |
| 10,725,567 B1 | 7/2020 | Huang et al. |
| 11,372,457 B1 | 6/2022 | Lee et al. |
| 11,402,931 B1 | 8/2022 | Lee |
| 11,442,562 B2 | 9/2022 | Li |
| 11,537,177 B2 | 12/2022 | Pai et al. |
| 11,556,189 B1 | 1/2023 | Lee et al. |
| 2015/0185769 A1 | 7/2015 | Takata |
| 2017/0153703 A1 | 6/2017 | Yun et al. |
| 2017/0322591 A1 | 11/2017 | Lee et al. |
| 2018/0081483 A1 | 3/2018 | Camp et al. |
| 2019/0019639 A1 | 1/2019 | Lane et al. |
| 2019/0391659 A1 | 12/2019 | Woolley et al. |
| 2021/0263556 A1 | 8/2021 | Degner et al. |
| 2022/0374094 A1 | 11/2022 | Liu |
| 2023/0289000 A1* | 9/2023 | Liu .................... G06F 3/03547 |

FOREIGN PATENT DOCUMENTS

| | | |
|---|---|---|
| CN | 203689477 U | 7/2014 |
| CN | 205986813 U | 2/2017 |
| CN | 107659699 A | 2/2018 |
| CN | 111712783 A | 9/2020 |
| CN | 212302449 U | 1/2021 |
| CN | 113031792 A | 6/2021 |
| CN | 113296627 A | 8/2021 |
| CN | 214311665 U | 9/2021 |
| CN | 113867552 A | 12/2021 |
| CN | 215576545 U | 1/2022 |
| CN | 216052808 U | 3/2022 |
| CN | 114397969 A | 4/2022 |
| CN | 114415786 A | 4/2022 |
| CN | 114415851 A | 4/2022 |
| CN | 114637373 A | 6/2022 |
| TW | M520678 U | 4/2016 |
| TW | M604435 U | 11/2020 |

OTHER PUBLICATIONS

International Search Report of PCT/CN2022/130554 issued on Jan. 11, 2023.

International Search Report of PCT/CN2022/135974 issued on Jan. 23, 2023.

* cited by examiner (a)

(b)

SUPPORT ASSEMBLY, TOUCHPAD, AND ELECTRONIC DEVICE

CROSS-REFERENCE TO RELATED APPLICATIONS

This application is a continuation of U.S. patent application Ser. No. 18/074,909, filed on Dec. 5, 2022, now U.S. Pat. No. 12,013,993 B2, which is a continuation of International Application No. PCT/CN2022/094326 filed on May 23, 2022, and entitled "SUPPORT ASSEMBLY, TOUCHPAD, AND ELECTRONIC DEVICE", both of which are incorporated by reference herein in their entireties.

TECHNICAL FIELD

The present disclosure relates to the field of touch technologies, and in particular, to a support assembly, a touchpad, and an electronic device.

BACKGROUND

With technological innovation and progress, a touchpad of a laptop has implemented and replaced a function of an external mouse. As an input function of the touchpad becomes more powerful, consumers have higher requirements for experience.

As shown in FIG. 1(a), an existing detachable touchpad includes two components: a touch panel 1 and a mechanical key 2. The touch panel 1 cannot implement a pressing function and has a more complex structure, which affects human-computer interaction and an appearance effect. As shown in FIG. 1(b), an integrated touchpad combines a touch panel and a key into a whole board. A travel switch is arranged at a lower part of the module, and the press function is implemented through a single pendulum structure. However, only a lower half area 3 has a function during pressing, and the touchpad module occupies a lot of space in the entire touchpad. Therefore, a battery capacity is affected. In addition, the consistency of the feel when pressing is not good, and user experience is affected.

SUMMARY

The present disclosure provides a touchpad and an electronic device using the touchpad, which can implement full-area pressing of the touchpad, and implement balanced force feedback when a user presses the touchpad.

According to a first aspect, a touchpad is provided, including:
- a touch assembly and a support assembly, where the touch assembly is disposed on the support assembly, and the support assembly includes:
- a main support component, where the main support component is disposed at an edge of a bottom surface of the touch assembly;
- a fixed platform, where a boss is integrally formed on the fixed platform; and
- a first elastic component and a second elastic component, where the first elastic component and the second elastic component are symmetrically connected to the main support component along a plane in which the main support component is located, an opening for accommodating the fixed platform is formed between the first elastic component and the second elastic component, and the fixed platform is connected between the first elastic component and the second elastic component;

the support assembly has a sheet-like structure; and
a travel switch is disposed on the bottom surface of the touch assembly, and the boss on the fixed platform is configured to touch and trigger the travel switch when the touch assembly is pressed.

In some possible implementations, the support assembly further includes a first connecting component and a second connecting component.

The first connecting component and the second connecting component are respectively attached to the first elastic component and the second elastic component as reinforcement components.

In some possible implementations, the first elastic component and the second elastic component are connected to the main support component through cantilever beams, and the first elastic component and the second elastic component are connected to the fixed platform through cantilever beams.

In some possible implementations, the first elastic component includes a first elastic arm and a second elastic arm disposed transversely, and a first main body portion disposed longitudinally along the plane in which the main support component is located, where the first main body portion is connected between the first elastic arm and the second elastic arm; and the second elastic component includes a third elastic arm and a fourth elastic arm disposed transversely, and a second main body portion disposed longitudinally along the plane in which the main support component is located, where the second main body portion is connected between the third elastic arm and the fourth elastic arm.

In some possible implementations, the first connecting component has a first main body support part, a first support arm, and a second support arm, where the first main body support part is configured to reinforce the first main body portion, the first support arm is configured to reinforce the first elastic arm, and the second support arm is configured to reinforce the second elastic arm; and the second connecting component has a second main body support part, a third support arm, and a fourth support arm, where the second main body support part is configured to reinforce the second main body portion, the third support arm is configured to reinforce the third elastic arm, and the fourth support arm is configured to reinforce the fourth elastic arm.

In some possible implementations, the first elastic arm is butted with the third elastic arm, the second elastic arm is butted with the fourth elastic arm, a first gap exists between the first elastic arm and the third elastic arm and between the second elastic arm and the fourth elastic arm, and the opening for accommodating the fixed platform is formed between the main body portions and the elastic arms of the first elastic component and the second elastic component.

In some possible implementations, the first support arm has a first protruding portion, and the first protruding portion extends to an area where the third elastic arm is disposed to enable the first support arm and the third elastic arm to partially overlap each other; the third support arm has a third protruding portion, and the third protruding portion extends to an area where the first elastic arm is disposed to enable the third support arm and the first elastic arm to partially overlap each other; and the first protruding portion and the third protruding portion do not interfere with each other.

The second support arm has a second protruding portion, and the second protruding portion extends to an area where the fourth elastic arm is disposed to enable the second support arm and the fourth elastic arm to partially overlap each other; the fourth support arm has a fourth protruding portion, and the fourth protruding portion extends to an area where the second elastic arm is disposed to enable the fourth support arm and the second elastic arm to partially overlap each other; and the second protruding portion and the fourth protruding portion do not interfere with each other.

In some possible implementations, pressure point grooves are disposed on both sides of the sheet-like support assembly, to control flatness of the support assembly.

In some possible implementations, pressure point grooves are disposed on both sides of the main support component, the fixed platform, the first elastic component, the second elastic component, the first connecting component, and the second connecting component for controlling flatness of the support assembly.

In some possible implementations, depths of the pressure point grooves on the main support component are 0.06 mm to 1 mm, depths of the pressure point grooves on the fixed platform are 0.04 mm to 0.08 mm, depths of the pressure point grooves on the first elastic component and the second elastic component are 0.02 mm to 0.05 mm, and depths of the pressure point grooves on the first connecting component and the second connecting component are 0.04 mm to 0.08 mm.

In some possible implementations, flatness of the main support component is controlled to be less than 0.15 mm by disposing the pressure point grooves, and flatness of the fixed platform is controlled to be less than 0.05 mm by disposing the pressure point grooves.

In some possible implementations, the main support component has a first border and a second border that are opposite to each other, the first border is connected to the first elastic component, an opening is disposed in the middle of the first border to cut off the first border, the second border is connected to the second elastic component, and an opening is disposed in the middle of the second border to cut off the second border.

In some possible implementations, a center pressing column in contact with the boss on the fixed platform is disposed on the travel switch, and when a touch panel is not pressed, the center pressing column and the boss interfere with each other.

In some possible implementations, the touch assembly includes a cover plate and a circuit board, the cover plate is connected to the circuit board by using a fixing glue for the cover plate, and the circuit board is connected to the main support component by using an adhesive tape.

The adhesive tape is a double-sided foam tape.

According to a second aspect, a support assembly is provided, configured to support the touch assembly and apply a trigger force to the touch assembly, and including:

a main support component, where the main support component is disposed at an edge of a bottom surface of the touch assembly;

a fixed platform, where a boss is integrally formed on the fixed platform;

a first elastic component and a second elastic component, where the first elastic component and the second elastic component are symmetrically connected to the main support component through cantilever beams along a plane in which the main support component is located, an opening for accommodating the fixed platform is formed between the first elastic component and the second elastic component, the fixed platform is connected between the first elastic component and the second elastic component, and the first elastic component and the second elastic component are connected to the fixed platform through the cantilever beams; and a first connecting component and a second connecting component, where the first connecting component and the second connecting component are respectively attached to the first elastic component and the second elastic component as reinforcement components.

The support assembly has a sheet-like structure.

In some possible implementations, the first elastic component includes a first elastic arm and a second elastic arm disposed transversely, and a first main body portion disposed longitudinally along the plane in which the main support component is located, where the first main body portion is connected between the first elastic arm and the second elastic arm; and the second elastic component includes a third elastic arm and a fourth elastic arm disposed transversely, and a second main body portion disposed longitudinally along the plane in which the main support component is located, where the second main body portion is connected between the third elastic arm and the fourth elastic arm.

In some possible implementations, the first connecting component has a first main body support part, a first support arm, and a second support arm, where the first main body support part is configured to reinforce the first main body portion, the first support arm is configured to reinforce the first elastic arm, and the second support arm is configured to reinforce the second elastic arm; and the second connecting component has a second main body support part, a third support arm, and a fourth support arm, where the second main body support part is configured to reinforce the second main body portion, the third support arm is configured to reinforce the third elastic arm, and the fourth support arm is configured to reinforce the fourth elastic arm.

In some possible implementation manners, the first elastic arm is butted with the third elastic arm, and the second elastic arm is butted with the fourth elastic arm.

The first support arm has a first protruding portion, and the first protruding portion extends to an area where the third elastic arm is disposed to enable the first support arm and the third elastic arm to partially overlap each other; the third support arm has a third protruding portion, and the third protruding portion extends to an area where the first elastic arm is disposed to enable the third support arm and the first elastic arm to partially overlap each other; and the first protruding portion and the third protruding portion do not interfere with each other.

The second support arm has a second protruding portion, and the second protruding portion extends to an area where the fourth elastic arm is disposed to enable the second support arm and the fourth elastic arm to partially overlap each other; the fourth support arm has a fourth protruding portion, and the fourth protruding portion extends to an area where the second elastic arm is disposed to enable the fourth support arm and the second elastic arm to partially overlap each other; and the second protruding portion and the fourth protruding portion do not interfere with each other.

According to a third aspect, an electronic device is provided, including the touchpad module according to any possible implementation of the first aspect and an electronic device housing, where the touchpad module is fixedly mounted in the electronic device housing.

DETAILED DESCRIPTION

The present disclosure relates to a touchpad of a computer, for example, a laptop, a notebook computer, a tablet, or a related electronic device. Generally, a size of an electronic device, in particular a portable electronic device, gradually decreases. Because a surface area that is used to receive touch and gesture inputs does not exist on a device housing, it is not desirable to add an unnecessary button. An existing touchpad is a rotatable structure when a user presses it because it is pivotally connected to a hinge along an edge of a rectangular shape of the touchpad. This type of touchpad may be referred to as a "diving board". This type of touchpad needs to a small tapping force at one end of a hinge support edge away from the touchpad, and it is difficult to tap near the hinge support edge. That is, consistency of tapping forces on the entire touchpad is poor, thereby user experience is poor and function extension of the touchpad is also affected.

The present disclosure relates to a touchpad module, which can implement full-area pressing of a touch panel, and can implement balanced force feedback at any position on the touch panel. The solution of the present disclosure relates to optimization of performance parameters of a touchpad, such as sensitivity and pressing force consistency. Considering a thin and low-cost design of the module, the ultimate objective is to implement full-area pressing of the touchpad module and improve user comfort.

To make the objective, technical solutions, and advantages of the present disclosure clearer, the following further describes the present disclosure in detail with reference to embodiments. It should be understood that the specific embodiments described herein are only used to explain the present disclosure, and are not intended to limit the present disclosure.

Embodiment 1

Figure 1:
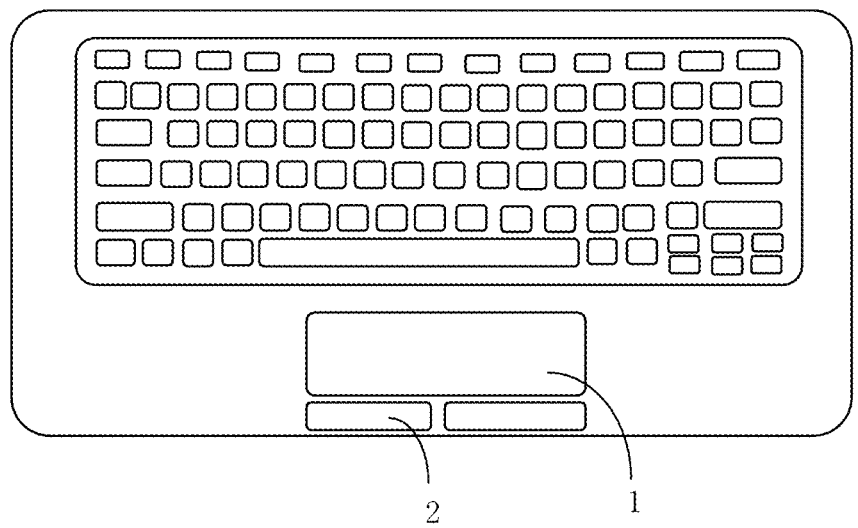
FIGS. 1(a) and (b) are schematic diagrams of structures of keyboard input parts of existing notebook computers.
Figure 1:
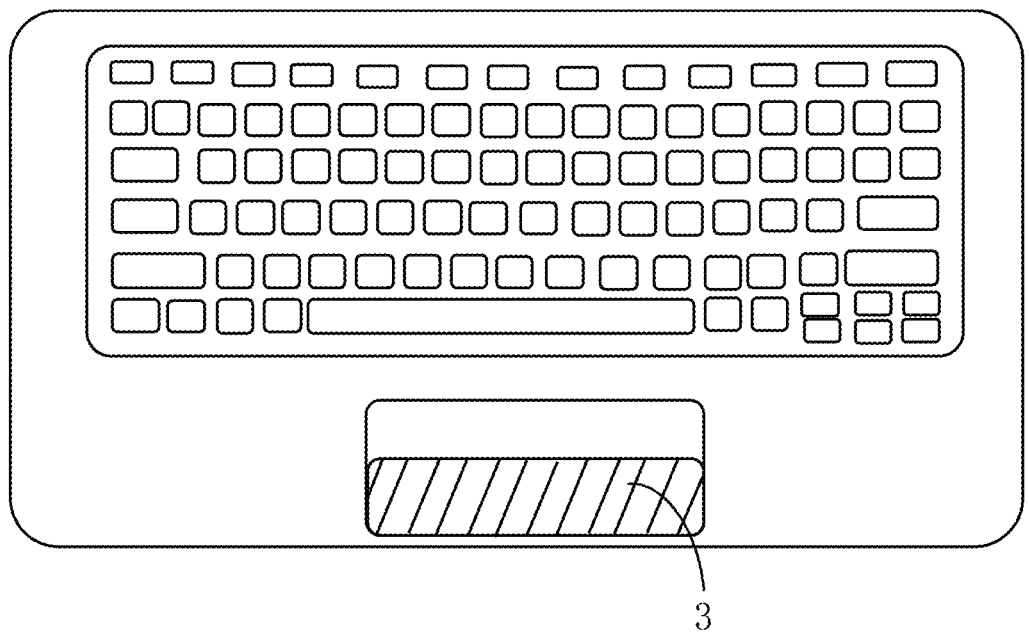
Figure 2:
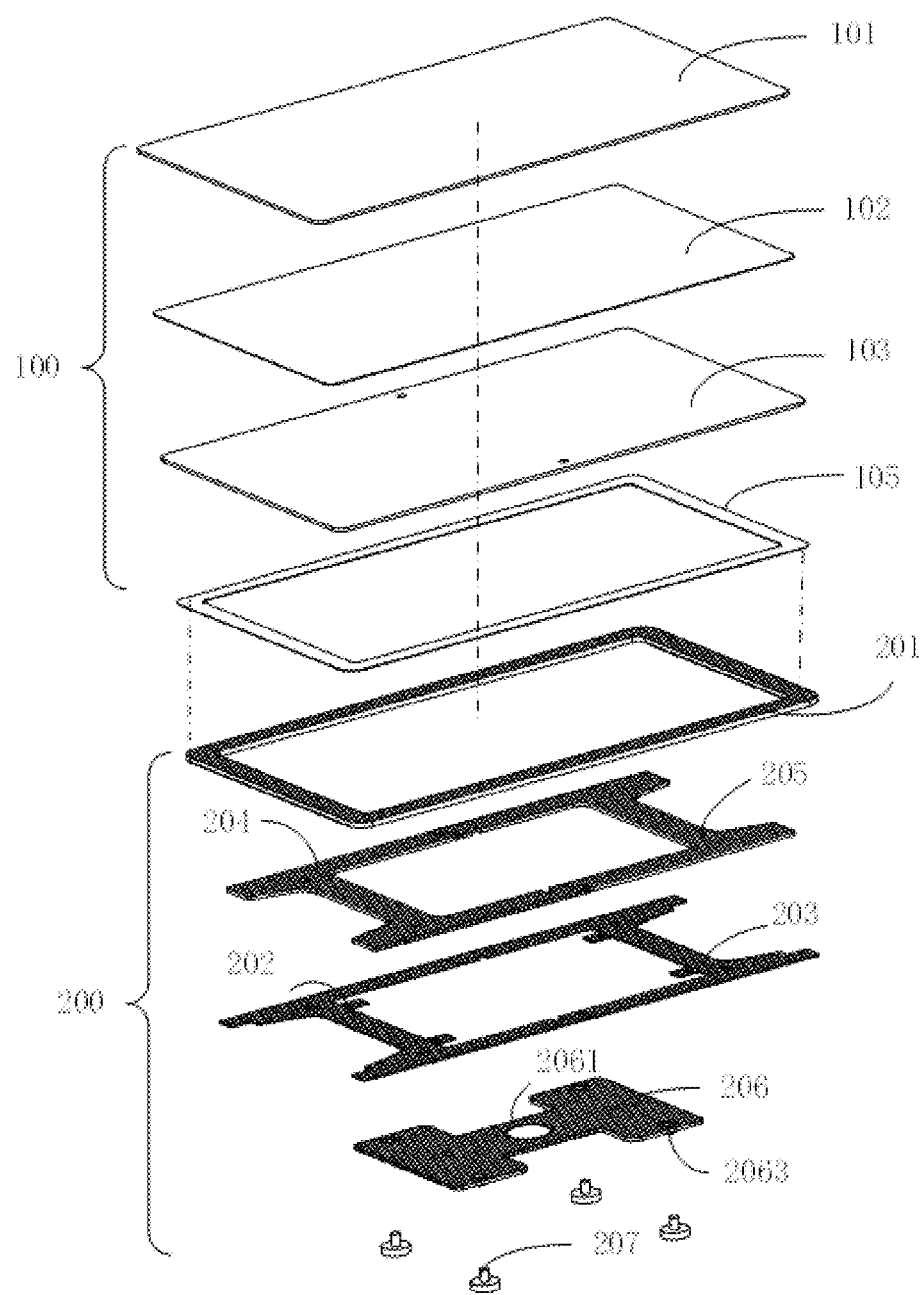
FIG. 2 is an exploded view of a structure of a touchpad according to an embodiment of the present disclosure.
Figure 3:
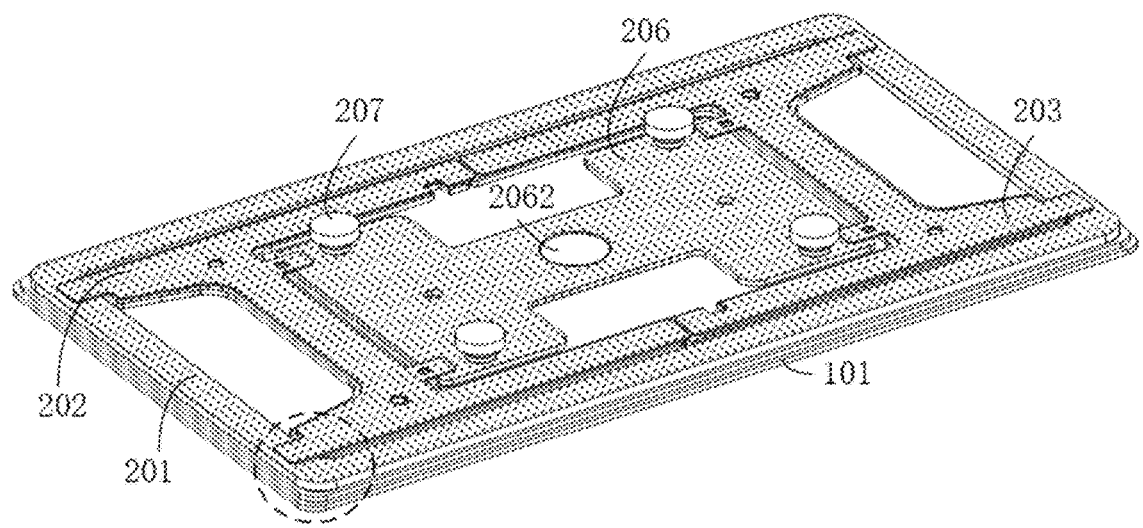
FIG. 3 is a bottom view of a structure of a touchpad according to an embodiment of the present disclosure.
Figure 4:
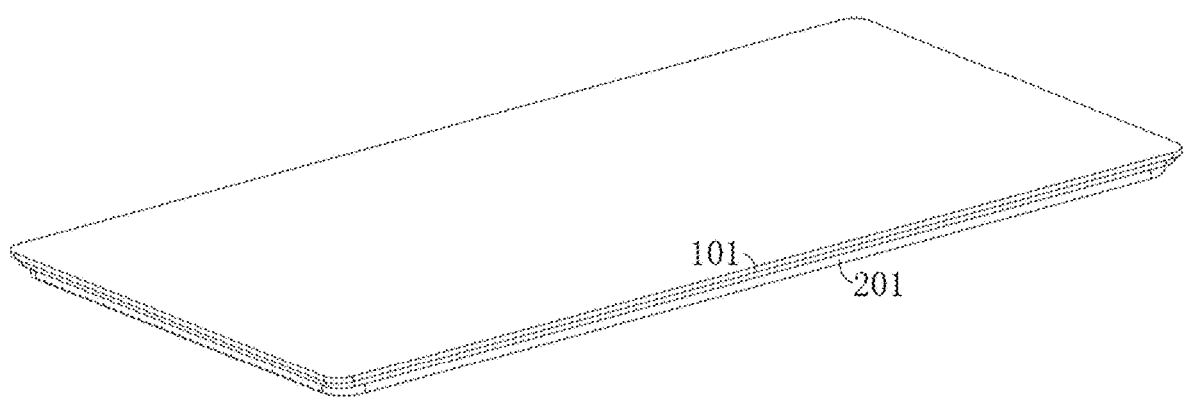
FIG. 4 is a front view of a structure of a touchpad module according to an embodiment of the present disclosure.

FIG. 2 shows an exploded view of a structure of a touchpad provided in this embodiment of the present disclosure. FIG. 3 shows a bottom view of the structure of the touchpad provided in this embodiment of the present disclosure. FIG. 4 shows a front view of the structure of the touchpad provided in this embodiment of the present disclosure.

As shown in FIG. 2 to FIG. 4, in this embodiment, the touchpad sequentially includes, from top to bottom, a cover plate 101, a fixing glue 102 for the cover plate, a circuit board 103, a travel switch 104 (not shown), an adhesive tape 105, a main support component 201, a first elastic component 202, a second elastic component 203, a first connecting component 204, a second connecting component 205, a fixed platform 206, and retaining screws 207. The cover plate 101, the fixing glue 102 for the cover plate, the circuit board 103, and the travel switch 104 form a touch assembly 100. The main support component 201, the first elastic component 202, the second elastic component 203, the first connecting component 204, the second connecting component 205, and the fixed platform 206 form a support assembly 200. The touch assembly 100 is disposed on the support assembly 200. The touch assembly 100 is connected to the support assembly 200 by using the adhesive tape 105 to form the touchpad. The touchpad may be connected to a housing of an electronic device by using the retaining screws 207.

The cover plate 101 is located on an outer surface of the entire touchpad, and is a substantially planar rigid material sheet. The top surface of the cover plate 101 is configured to contact one or more user objects, such as a finger and a stylus, when the touchpad is operated. Thus, a user may apply force to the top surface of the cover 101 by clicking, sliding, pressing, or in another manner with the one or more user objects, to provide an input. The cover plate 101 is made of a rigid material, and may be specifically a non-conductive rigid object made of glass, a PC sheet, a ceramic sheet, or the like. The top surface of the cover plate 101 may be smooth or may have a rough texture, so that the appearance of the touchpad conforms to a product aesthetic design. The cover plate 101 may be of a generally rectangular shape. In some preferred implementations, a rectangular outer surface edge of the cover plate 101 may be rounded. In another possible implementation, the shape of the cover plate may be a circular shape, a triangular shape, or a similar basic shape, and is used to receive a touch input of the user.

The fixing glue 102 for the cover plate is configured to glue the cover plate 101 and the circuit board 103. The fixing glue 102 for the cover plate may be a liquid glue or a solid glue. It should be noted that there is no bubble in the middle after the cover plate 101 and the circuit board 103 are glued together by using the fixing glue 102 for the cover plate.

The circuit board 103 is specifically a printed circuit board (PCB). A touch sensor, the travel switch 104, a connector, and another electronic element are mounted on the PCB by using a surface mounted technology (SMT) or configured on the PCB through dual in-line package (DIP) to implement printed circuit board assembly (PCBA). The PCBA is configured to implement a touch sensing function of the touchpad. In an implementable implementation, the touch sensor is specifically a touch sensing layer disposed in the PCB. For example, the touch sensor may include a capacitive touch sensor, and the capacitive touch sensor is configured to sense a capacitance change at the cover plate 101 in response to a touch contact of the user. Alternatively, the touch sensor may include a resistive touch sensor, and the resistive touch sensor is configured to sense a resistance change at the cover plate 101 in response to a touch contact of the user. The cover plate 101 and the circuit board 103 may also be referred to as a touch assembly, and the touch assembly receives a pressing force applied by a touch of the user.

Figure 5:
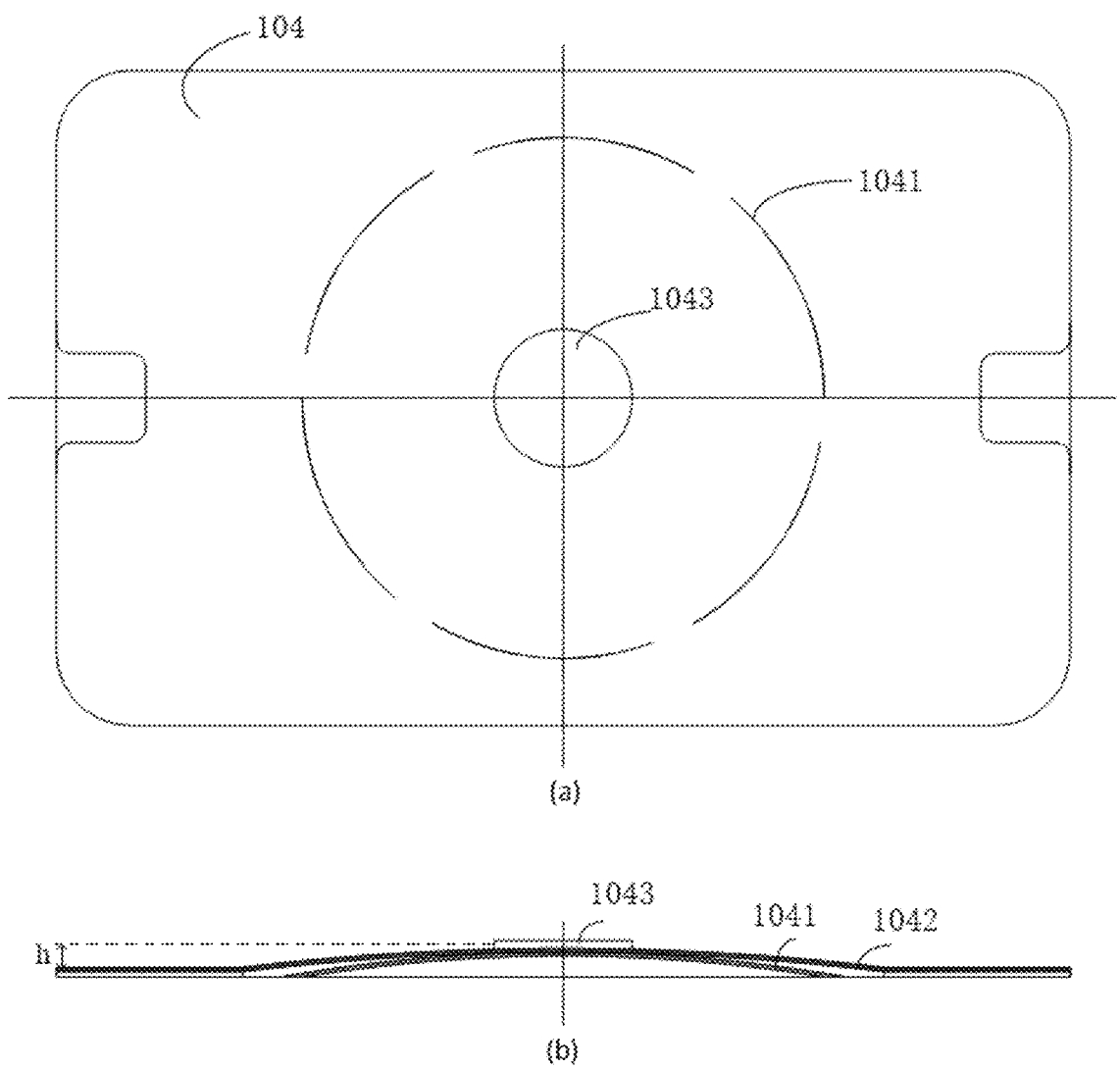
FIGS. 5(a) and (b) are schematic diagrams of a specific structure of a travel switch according to an embodiment of the present disclosure.

FIGS. 5(a) and (b) are schematic diagrams of a specific structure of the travel switch provided in Embodiment 1 of the present disclosure. In general, the travel switch 104 may be a flexible structure, and is elastically deformed when the cover plate 101 is forced to move; and the travel switch 104 may alternatively be a compressible structure, and is compressed when the cover plate 101 is forced to move. More specifically, the travel switch 104 may include a flexible material or an elastic material, for example, rubber or a flexible metal; and the travel switch 104 further includes a conductive material used for an electrical signal indicating that the switch has been driven. The travel switch may be specifically disposed in the center of a lower surface of the circuit board 103, and is fastened to the circuit board 103 in a gluing manner or an SMT manner. The entire PCBA may implement a communication function by using the connector and a notebook computer keyboard or a keyboard holster. In another embodiment, the travel switch 104 may alternatively be disposed at another position below the circuit board 103 as required.

In this embodiment, the travel switch 104 is a metal dome (Metal Dome), specifically, a polyethylene terephthalate (PET) sheet including a metal spring plate (snap dome), and is used as a switch on a circuit board, for example, a PCB or an FPC. FIGS. 5(a) and (b) show a specific structure of the metal dome, where FIGS. 5(a) and (b) are respectively a main view and a side view of the metal dome. The metal dome includes a metal spring plate 1041, a polyester film (Mylar) 1042, and a center pressing column 1043, where a diameter $\varphi$ of the metal spring plate 1041 is 7 mm, a diameter $\varphi$ of the center pressing column is 1.85 mm, outline dimensions are 13.6 mm*8.8 mm, an overall thickness h is 0.49 mm, and a load of the dome is 180 g.

Figure 6:
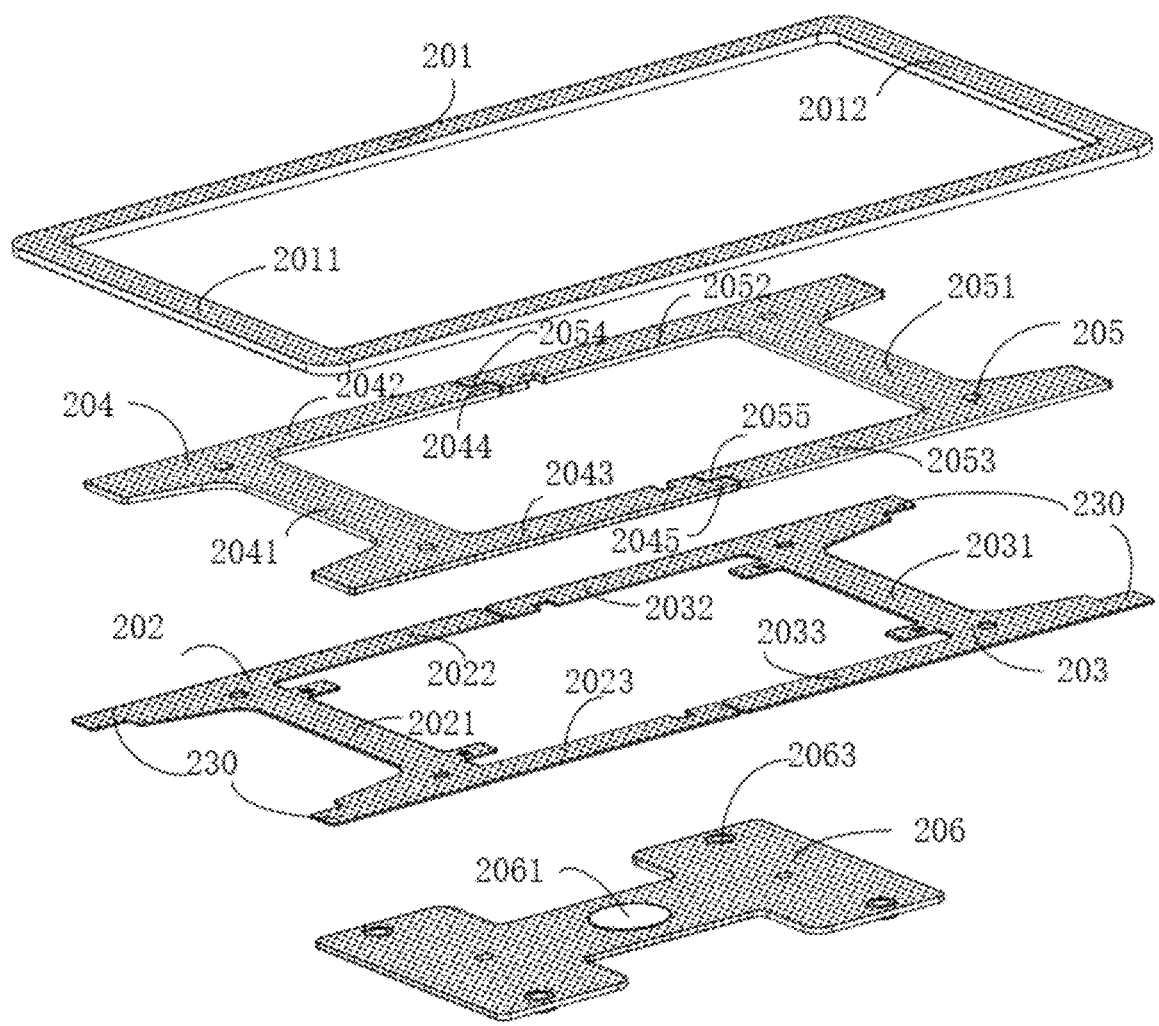
FIG. 6 is an exploded view of a structure of a support assembly according to an embodiment of the present disclosure.
Figure 7:
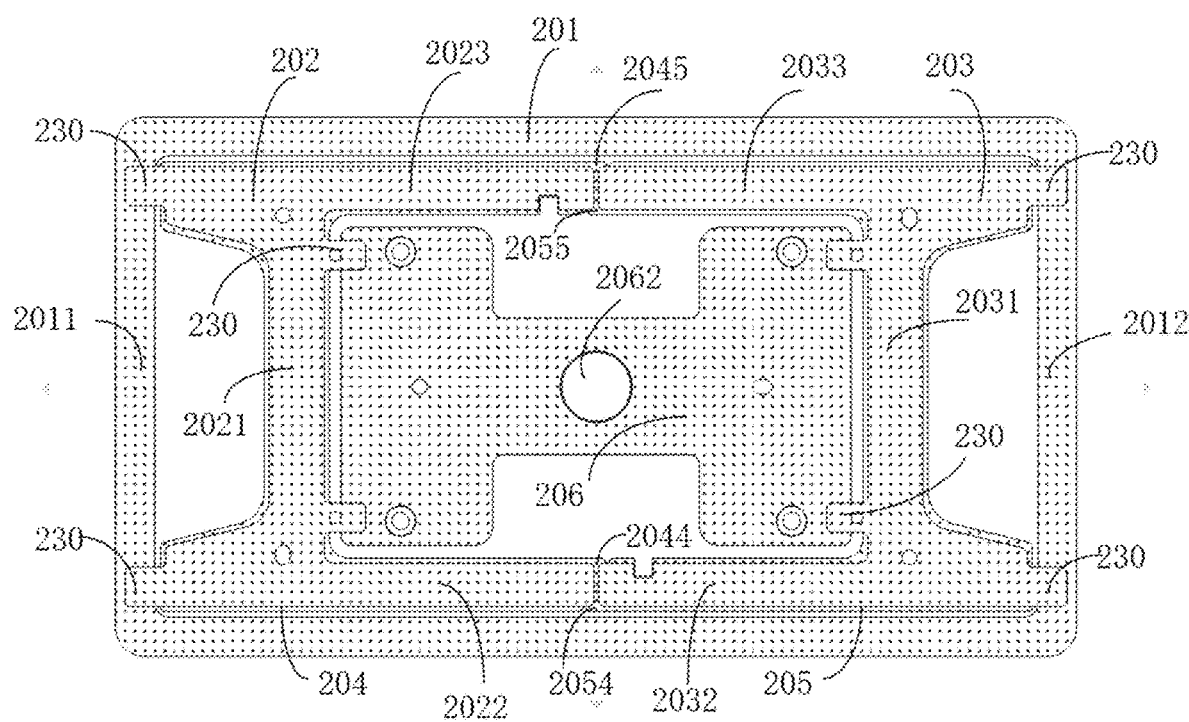
FIG. 7 is a bottom view of an assembled support assembly according to an embodiment of the present disclosure.

FIG. 6 is an exploded view of the support assembly 200, and FIG. 7 is a bottom view of an assembled support assembly 200.

With reference to FIG. 6 and FIG. 7, in this embodiment, the support assembly 200 may include a main support component 201, a first elastic component 202, a second elastic component 203, a first connecting component 204, a second connecting component 205, and a fixed platform 206. The foregoing components may be connected by welding, stamping, adhering, or in another manner to form the support assembly 200. The support assembly 200 is a linkage apparatus configured to, when any position of the touch assembly 100 is forced to move downward, enable the entire touchpad to move in synchronization. Specifically, the support assembly 200 is further configured to apply a force to the travel switch 104.

The main support component 201 may be a rectangular border, and has enough rigidity. The main support component 201 has a first border 2011 and a second border 2012 that are opposite to each other. The first elastic component 202 and the second elastic component 203 are respectively connected to the first border 2011 and the second border 2012 through cantilever beams 230.

The main support component 201 is fastened to an edge of a bottom surface of the circuit board 103 by using the adhesive tape 105 (refer to FIG. 2). Specifically, the adhesive tape 105 may be a double-sided foam tape of which the thickness is 0.15 mm, may absorb and prevent deformation of the main support component 201 in an assembly process, and has a thickness of 0.1 mm after assembly and compression.

For the first elastic component 202, the second elastic component 203, the first connecting component 204, and the second connecting component 205, the first connecting component 204 is attached to the first elastic component 202, the second connecting component 205 is attached to the second elastic component 203, and the first elastic component 202 and the second elastic component 203 include a material that can be elastically bent, for example, a metal spring plate. Because an elastic component is elastic, has a product form of a thin sheet, and is weak in strength, a connecting component of a similar shape is used for reinforcement and supporting, and the connecting component has certain rigidity. Specifically, the first connecting component 204 is configured to reinforce the first elastic component 202, and the second connecting component 205 is configured to reinforce the second elastic component 203. The connecting components are attached to surfaces, close to the cover plate 101, of the elastic components (for position relationships, refer to FIG. 2 and FIG. 3), to support and reinforce the elastic components. The connecting components may be attached to the elastic components to form integrated bodies by welding, stamping, adhering, or in another manner. Integral structures formed by the connecting components and the elastic components are symmetrically disposed along a plane in which the main support component 201 is located, the two connecting components do not interfere with each other, and the two elastic components do not interfere with each other.

With reference to FIG. 7, the first elastic component 202 and the second elastic component 203 are symmetrically connected to the main support component 201 through the cantilever beams 230 along the plane in which the main support component 201 is located, an opening for accommodating the fixed platform 206 is formed between the first elastic component 202 and the second elastic component 203, the fixed platform 206 is connected between the first elastic component 202 and the second elastic component 203, and the first elastic component 202 and the second elastic component 203 are connected to the left side and the right side of the fixed platform 206 through the cantilever beams 230. It can be learned that each of elastic components 202 and 203 has four cantilever beams 230, the first elastic component 202 is connected between the first border 2011 of the main support component 201 and the fixed platform 206 through two cantilever beams 230, and the second elastic component 203 is connected between the second border 2012 of the main support component 201 and the fixed platform 206 through two cantilever beams 230. More specifically, the cantilever beams 230 are tabs or tongues that protrude from the elastic components 202 and 203 and are separately connected to the main support component 201 and the fixed platform 206, and the elastic components at the positions of the cantilever beams 230, namely, the tabs or the tongues, do not need to be covered and reinforced by the connecting components, to ensure elasticity of the elastic components, so that the cantilever beams 230 can rotate, flex, bend or pivot relative to the main support component 201 or the fixed platform 206 when stressed. It can be learned that the unreinforced cantilever beams can produce greater elastic deformation.

As shown in FIG. 7, the first connecting component 204 and the second connecting component 205 have no contact with the main support component 201 and the fixed platform 206. In other words, the two connecting components 204 and 205 do not interfere with the main support component 201 and the fixed platform 206, and a suspended distance gap1>0.4 mm is maintained between the two connecting components and the main support component 104, so that the elastic components are correspondingly deformed.

As shown in FIG. 6 and FIG. 7, the support assembly 200 further includes the fixed platform 206, and a circular boss 2061 is integrally formed on the fixed platform. Practically, the boss 2061 is formed by extruding the fixed platform 206, and a groove 2062 is extruded on another surface, corresponding to the boss 2061, of the fixed platform 206 (as shown in FIG. 3).

The circular boss 2061 is configured to contact and trigger the travel switch 104 when the touch component 100 is pressed. In an implementable implementation, the boss 2061 may be disposed in a central area of the fixed platform 206, the boss 2061 is a cylindrical boss of which the diameter $\varphi$ is $(1.5\text{-}3)\pm 0.05$ mm and the height is $(0.05\text{-}0.15)\pm 0.02$ mm. An adjustment screw is replaced by the integrally formed boss structure, so that after assembly, it is unnecessary to adjust a pressing hand feel by using the adjustment screw to adjust a stroke of the travel switch, thereby simplifying an assembly process. Because the adjustment screw has a large machinable minimum size, a total thickness of the module is affected. Using the integrally formed circular boss 2061 to trigger the travel switch 104 may further reduce the total thickness of the touchpad after assembly, so that a minimum total thickness of the module reaches 2.85 mm, and a volume is reduced.

Nuts 2063 assembled with the retaining screws 207 are further disposed on the fixed platform 206. The touchpad can be assembled with the housing of the electronic device by using the nuts 2063 on the fixed platform 206 and the retaining screws 207.

With reference to FIG. 6 and FIG. 7, in an implementable implementation, the first elastic component 202 includes a first main body portion 2021 disposed longitudinally along the plane in which the main support component 201 is located, or may be referred to as a longitudinal arm. The first elastic arm 2022 and the second elastic arm 2023 that are disposed transversely may also be referred to as transverse arms. The first main body portion 2021 is connected between the first elastic arm 2022 and the second elastic arm 2023 to form an I-shaped or H-shaped sheet-like structure. The second elastic component 203 includes a second main body portion 2031 disposed longitudinally, and a third elastic arm 2032 and a fourth elastic arm 2033 disposed transversely along the plane in which the main support component 201 is located. The second main body portion 2031 is connected between the third elastic arm 2032 and the fourth elastic arm 2033. The first connecting component 204 and the second connecting component 205 have similar shapes with correspondingly connected elastic components, and are also of an I-shaped or H-shaped sheet-like structure. Specifically, the first connecting component 204 has a first main body support part 2041, a first support arm 2042, and a second support arm 2043, where the first main body support part 2041 is configured to reinforce the first main body portion 2021, the first support arm 2042 is configured to reinforce the first elastic arm 2022, and the second support arm 2043 is configured to reinforce the second elastic arm 2023. The second connecting component 205 has a second main body support part 2051, a third support arm 2052, and a fourth support arm 2053, where the second main body support part 2051 is configured to reinforce the second main body portion 2031, the third support arm 2052 is configured to reinforce the third elastic arm 2032, and the fourth support arm 2053 is configured to reinforce the fourth elastic arm 2033.

It should be noted that, as shown in FIG. 7, gaps correspondingly disposed on the second elastic arm 2023 and the second support arm 2043 and gaps correspondingly disposed on the third elastic arm 2032 and the third support arm 2052 are intended to avoid arrangement settings of circuit elements, so that it can be implemented that the gaps may be evaded by adjusting positions of the circuit elements.

The first elastic component 202 and the second elastic component 203 are symmetrically connected to the main support component 201 along the plane in which the main support component 201 is located, and an opening for accommodating the fixed platform 206 is formed between the two I-shaped or H-shaped sheet-like structures. The first elastic arm 2022 of the first elastic component 202 of one I-shaped or H-shaped sheet-like structure and the third elastic arm 2032 of the second elastic component 203 of the other I-shaped or H-shaped sheet-like structure are butted with each other but do not interfered with each other along the plane in which the main support component 201 is located, and gap2>0.5 mm needs to be ensured between the two elastic arms. Similarly, the second elastic arm 2023 and the fourth elastic arm 2033 are butted with each other but do not interfered with each other, and gap2>0.5 mm needs to be ensured between the two elastic arms. The opening for accommodating the fixed platform 206 is specifically formed between the main body portions and the elastic arms of the first elastic component 202 and the second elastic component 203.

A linkage connection structure is formed between the first elastic component 202, the second elastic component 203, the first connecting component 204, and the second connecting component 205. Therefore, when the left side of the touchpad is pressed, a force is transmitted to the right side through the elastic arms and the support arms, so that the right side also simultaneously moves downward; and when the right side of the touchpad is pressed, a force is transmitted to the left side through the elastic arms and the support arms, so that the left side also simultaneously moves downward.

Specifically, the first support arm 2042 has a first protruding portion 2044, and the first protruding portion 2044 extends to an area where the third elastic arm 2032 is disposed to enable the first support arm 2042 and the third elastic arm 2032 to partially overlap each other; the third support arm 2052 has a third protruding portion 2054, and the third protruding portion 2054 extends to an area where the first elastic arm 2022 is disposed to enable the third support arm 2052 and the first elastic arm 2022 to partially overlap each other; and the first protruding portion 2044 and the third protruding portion 2054 do not interfere with each other.

The second support arm 2043 has a second protruding portion 2045, and the second protruding portion 2045 extends to an area where the fourth elastic arm 2033 is disposed to enable the second support arm 2043 and the fourth elastic arm 2033 to partially overlap each other; the fourth support arm 2053 has a fourth protruding portion 2055, and the fourth protruding portion 2055 extends to an area where the second elastic arm 2023 is disposed to enable the fourth support arm 2053 and the second elastic arm 2023 to partially overlap each other; and the second protruding portion 2045 and the fourth protruding portion 2055 do not interfere with each other.

In other words, the support arm of the first connecting component 204 on the left side is connected to the elastic arm of the second elastic component 203 on the right side through a protruding portion structure, the support arm of the second connecting component 205 on the right side is connected to the elastic arm of the first elastic component 202 on the left side through a protruding portion structure, and the two protruding portions 2044 and 2054 and the two protruding portions 2045 and 2055 are arranged in parallel with each other in directions in which the support arms extend. Therefore, when the left side of the touchpad is pressed, a force can be transmitted to the right side through a partial cross-connection structure of the elastic arms and the support arms, so that the right side also simultaneously moves downward; and similarly, when the right side of the touchpad is pressed, a force can be transmitted to the left side through the partial cross-connection structure of the elastic arms and the support arms, so that the left side also simultaneously moves downward.

In this embodiment, a core operating principle of the full-area pressing touchpad is as follows: After the user presses the central area of the cover plate 101 of the touchpad, the support assembly 200 is elastically deformed through a cantilever beam structure, and the touchpad moves downward in a pressing direction until the circular boss 2061 on the fixed platform 206 compresses the center pressing column 1043 and triggers the travel switch 104, thereby implementing a touch pressing function. When the user presses the left side of the cover plate 101 of the touchpad, the touch assembly 100 moves downward through the cantilever beam structure, the support assembly 200 uses the fixed platform 206 as a support plane to move downward under a downward deformation of the elastic component 202 on the left side, and the elastic component 202 on the left side transmits a force to the right side through the partial cross-connection structure of the elastic arms and the support arms, to drive the right side to simultaneously move downward. It should be noted that there may be a deviation between downward displacements of the left side and the right side, and generally, the downward displacement of a pressed side is larger. The foregoing downward movement causes the touch assembly 100 to continuously move downward to contact the circular boss 2061 on the fixed platform and trigger the travel switch 104 to implement a pressing function. When the user presses the right side, a force is transmitted to the left side in a similar way, so that the left side also simultaneously moves downward. In other words, when the cover plate 101 is pressed, the elastic components are elastically deformed, so that the touch assembly 100 continuously moves in the pressing direction toward the fixed platform 206, and the circular boss 2061 contacts the center pressing column 1043 and triggers the travel switch 104.

Figure 8:
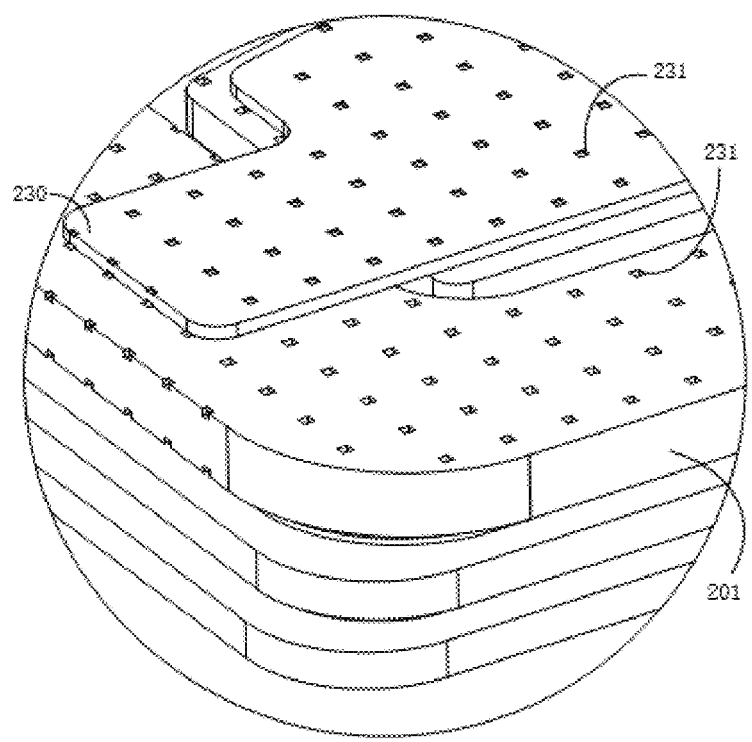
FIG. 8 is a partially enlarged view of a corner of the touchpad shown in FIG. 3.

FIG. 8 is a partially enlarged view of the touchpad shown in FIG. 3, and specifically shows a partially enlarged view of pressure point grooves 231 on the support assembly. Specifically, to control flatness of the support assembly 200, the pressure point grooves 231 are disposed on both sides of the main support component 201, the fixed platform 206, the first elastic component 202, the second elastic component 203, the first connecting component 204, and the second connecting component 205, as shown in FIG. 2, FIG. 6, and FIG. 7. The flatness refers to a deviation of a macro concave-convex height of a substrate relative to an ideal plane. Excessively large flatness of the support assembly 200 causes a poor pressing force consistency of a touch panel, that is, pressing at different positions of the touch panel requires different forces, and fluctuation of the pressing forces is large. In addition, if the flatness is large, a press stroke needs to be added with a size of the flatness, which also results in that a press stroke of the touchpad is large, thereby affecting user experience. Therefore, performing a flatness control design may further optimize a performance parameter of the touchpad, to improve user experience.

As shown in FIG. 8, in an implementable implementation, the pressure point grooves are square grooves with side lengths of 0.15 mm. Alternatively, the pressure point grooves may be circular grooves or other polygonal grooves, and depths of the pressure point grooves on the main support component, the fixed platform, the elastic components, and the connecting components are different. The depths of the pressure point grooves on the main support component 201 are 0.06 mm to 1 mm, to control the flatness of the main support component to be less than 0.15 mm. The depths of the pressure point grooves on the fixed platform 206 are 0.04 mm to 0.08 mm, to control the flatness of the fixed platform to be less than 0.05 mm. The depths of the pressure point grooves on the first elastic component 202 and the second elastic component 203 are 0.02 mm to 0.05 mm, and the depths of the pressure point grooves on the first connecting component 204 and the second connecting component 205 are 0.04 mm to 0.08 mm.

In another alternative implementation, the pressure point grooves may be further disposed on both sides of the entire support assembly 200, to control the flatness of the entire support assembly 200. Specifically, the pressure point grooves are disposed on both sides of the main support component 201 and the fixed platform 206, but on only one side of each of the first elastic component 202, the second elastic component 203, the first connecting component 204, and the second connecting component 205. That is, the surfaces, in contact with each other, of the first elastic component 202 and the first connecting component 204 have no pressure point groove, and the surfaces, in contact with each other, of the second elastic component 203 and the second connecting component 205 have no pressure point groove.

A technological process of assembling the touchpad throughout the entire area of which pressing operation can be performed includes: The cover plate 101 and the fixing glue 102 for the cover plate are mounted together to form an assembly 1, where it is ensured that there is no bubble between the cover plate 101 and the fixing glue 102 for the cover plate; the PCBA after SMT and the assembly 1 are mounted together to form an assembly 2; the first elastic component 202, the second elastic component 203, the first connecting component 204, the second connecting component 205, the main support component 201, and the fixed platform 206 are connected together through a laser welding process to form an assembly 3; and the assembly 2 and the assembly 3 are mounted together by using the adhesive tape 105 to form the foregoing touchpad.

Figure 9:
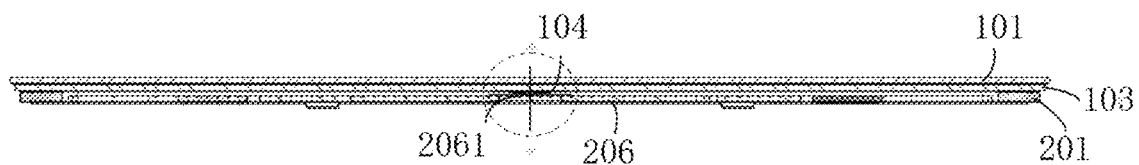
FIG. 9 is a sectional view of an assembled touchpad according to an embodiment of the present disclosure.
Figure 10:
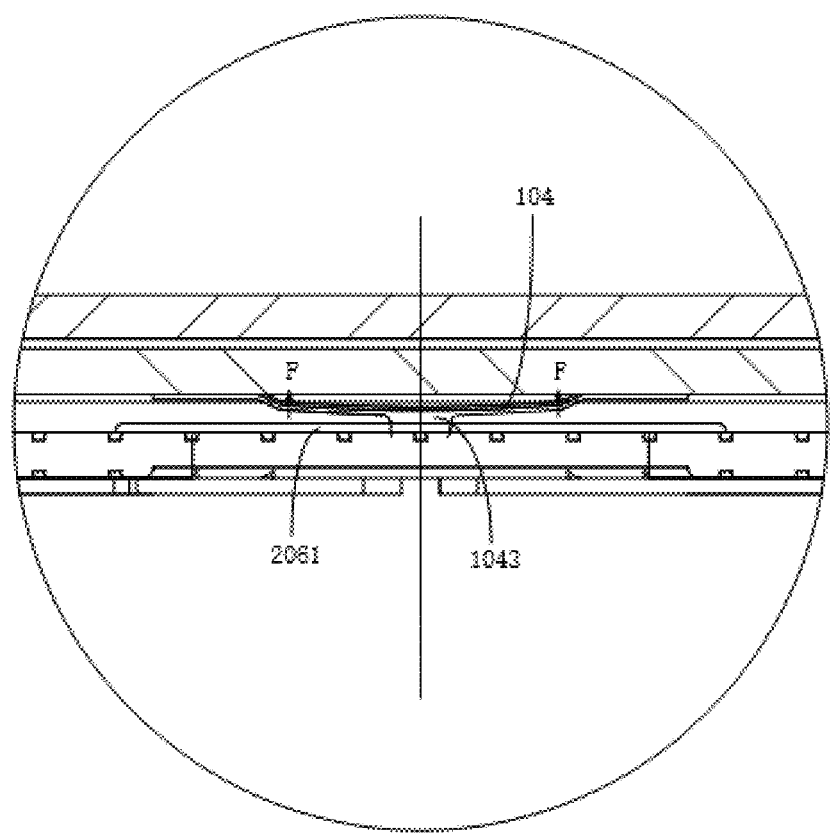
FIG. 10 is a partially enlarged view of the center of the touchpad in FIG. 9.

FIG. 9 is a sectional view of an assembled touchpad. FIG. 10 is a partially enlarged view of the center of the touchpad in FIG. 9, and specifically shows an interference structure between the travel switch 104 and the circular boss 2061 of the touchpad. In an implementable implementation, after the touchpad is mounted/assembled, in a case in which the touchpad is not pressed and in a static state, the circular boss 2061 on the fixed platform 206 and the center pressing column 1043 on the travel switch 104 interfere with each other and are crossed by 0.1 mm, and the metal spring plate in the travel switch 104 is elastically deformed to offset the interference, that is, the metal spring plate is compressed by 0.1 mm, and the circular boss 2061 is in hard contact with the surface of the center pressing column 1043, and the surface is in a zero-to-zero state. The design of the foregoing interference structure may compensate for a gap generated by deformations of the main support component and the fixed platform. Because the flatness of the support assembly 201 is controlled (less than 0.15 mm), the design that the circular boss 2061 and the center pressing column 1043 structurally interfere with each other may be implemented, and accordingly, the press stroke of the touchpad is affected. In some other implementations, the assembling of the touch assembly 100 may not interfere with the assembling of the support assembly 200, or a size of interference may be another possible value.

In the foregoing solution, after the touchpad is assembled, a press deviation of 25 points, a press stroke, and a pressing force value fluctuation parameter of the module are tested. Specifically, a method for testing a deviation percentage (pressure consistency) of the 25 points includes:

(1) dividing the touchpad into 5 rows and 5 columns, totally 25 square grids, and testing a trigger pressure of each position successively;
(2) selecting one position of the 25 square grids, using a static pressure head with q of 10 mm to slowly apply a pressure until a touchpad key responds, and recording a device reading during responding;
(3) testing each position for 10 times, and taking the average value of data of the 10 times as a trigger force threshold of the position; and
(4) obtaining the deviation percentage by dividing a ten-time average trigger pressure value of the 25 points by a node average value.

A test result shows that the deviation of the 25 points is less than 15.8%, the press stroke is between 0.13 mm and 0.4 mm, and the pressing force value fluctuation is between 200 N−14% and 200 N+14%. It can be learned that the test data shows that the foregoing solution reduces the press deviation of the 25 points of the touchpad, improves the pressing force consistency, shortens the press stroke, makes the pressing force value fluctuation small, and improves user experience. Specific test data is shown in Table 1.

Embodiment 2

A structure provided in this embodiment a further optimization of the main support component of the touchpad in Embodiment 1.

Figure 11:
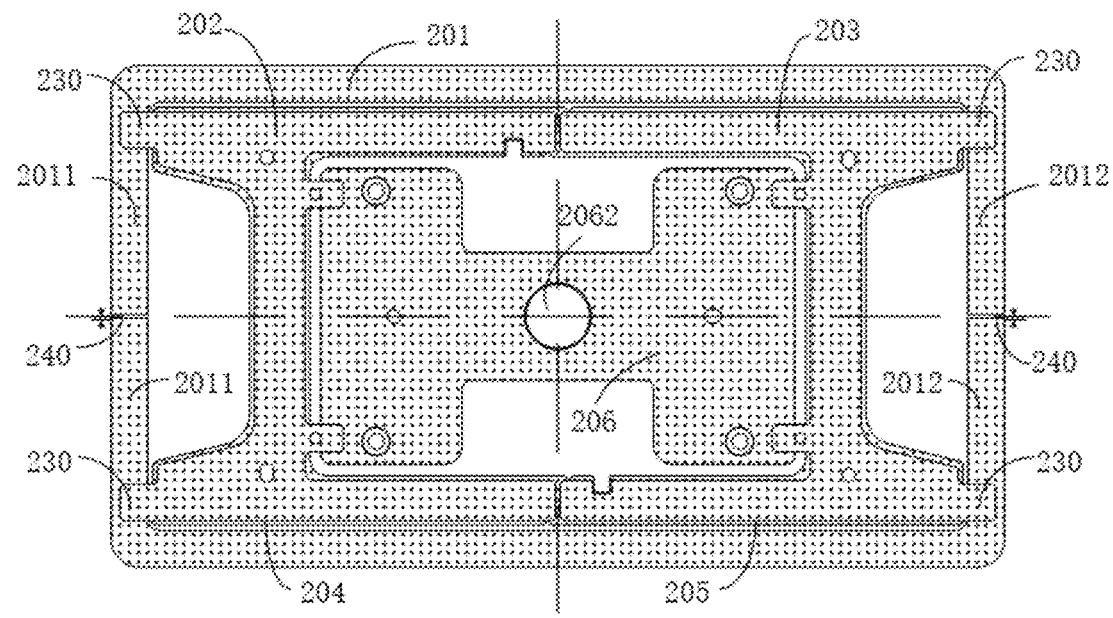
FIG. 11 is a bottom view of a support assembly according to another embodiment of the present disclosure.

FIG. 11 is a bottom view of the support assembly in another embodiment. Specifically, the main support component 201 has the first border 2011 and the second border 2012 that are opposite to each other. The first border 2011 is connected to the first elastic component 202. An opening 240 is disposed in the middle of the first border 2011 to cut off the first border 2011, and a width of the opening 240 is 0.2 mm to 0.4 mm. After the cutting, the first elastic component 202 is separately connected to two first borders 2011 after the cutting through two cantilever beams 230. The second border 2012 is connected to the second elastic component 203. An opening 240 is disposed in the middle of the second border 2012 to cut off the second bezel 2012, and a width of the opening 240 is 0.2 mm to 0.4 mm. After the cutting, the second elastic component 203 is separately connected to two second borders 2012 after the cutting through two cantilever beams 230. Adding the openings 240 to the middle positions of the left and right ends of the main support component 201 may further reduce stress caused by deformation of the main support component 201, thereby improving parameter indexes such as pressing force consistency. In this embodiment, in addition to the opening structure of the main support component, structures of other parts are consistent with the description in Embodiment 1.

After the touchpad is assembled by using the foregoing opening cut-off solution, the press deviation of the 25 points, the press stroke, and the pressing force value fluctuation parameter of the module are tested, and the test result shows that the deviation of the 25 points is less than 14.6%, the press stroke is between 0.1 mm and 0.37 mm, and the pressing force value fluctuation is between 146 N−6% and 146 N+6%. It can be learned that the test data shows that the

TABLE 1

Test data of the press deviation of the 25 points, the press stroke, and the pressing force value fluctuation

|  | Row | Column 1 | 2 | 3 | 4 | 5 | Average value of the 25 points |
|---|---|---|---|---|---|---|---|
| Trigger pressure/g | 1 | 235 | 219 | 211 | 221 | 235 | 221 |
|  | 2 | 233 | 215 | 206 | 217 | 237 |  |
|  | 3 | 230 | 212 | 202 | 214 | 235 |  |
|  | 4 | 232 | 212 | 203 | 212 | 233 |  |
|  | 5 | 233 | 213 | 207 | 221 | 235 |  |

|  | Row | Column 1 | 2 | 3 | 4 | 5 | max-min |
|---|---|---|---|---|---|---|---|
| Deviation percentage | 1 | −6.0% | 1.0% | 4.7% | −0.1% | −6.0% | 15.8% |
|  | 2 | −5.3% | 2.9% | 7.0% | 1.9% | −6.7% |  |
|  | 3 | −3.8% | 4.2% | 9.1% | 3.2% | −5.9% |  |
|  | 4 | −4.7% | 4.0% | 8.8% | 4.4% | −5.1% |  |
|  | 5 | −5.0% | 3.5% | 6.6% | −0.3% | −6.0% |  |
| Press stroke (mm) |  | 0.13-0.4 |  | Pressing force value |  | 200 ± 14% | N/A | foregoing solution further reduces the press deviation of the 25 points of the touchpad, improves the pressing force consistency, further shortens the press stroke, further reduces the pressing force value fluctuation, improves performance, and further improves user experience.

Specific test data is shown in Table 2.

TABLE 2

Test data of the press deviation of the 25 points, the press stroke, and the pressing force value

| | Row | Column 1 | 2 | 3 | 4 | 5 | Average value of the 25 points |
|---|---|---|---|---|---|---|---|
| Trigger pressure/g | 1 | 149 | 139 | 133 | 137 | 146 | 145 |
| | 2 | 151 | 140 | 134 | 138 | 149 | |
| | 3 | 151 | 145 | 137 | 144 | 151 | |
| | 4 | 152 | 147 | 142 | 145 | 152 | |
| | 5 | 153 | 149 | 146 | 150 | 154 | |

| | Row | Column 1 | 2 | 3 | 4 | 5 | max-min |
|---|---|---|---|---|---|---|---|
| Deviation percentage | 1 | −2.6% | 4.8% | 9.2% | 6.0% | −0.6% | 14.6% |
| | 2 | −3.5% | 3.5% | 8.6% | 5.1% | −2.1% | |
| | 3 | −3.7% | 0.6% | 5.9% | 1.2% | −3.5% | |
| | 4 | −4.5% | −1.4% | 2.4% | 0.0% | −4.6% | |
| | 5 | −5.1% | −2.3% | −0.6% | −2.8% | −5.4% | |
| Press stroke (mm) | | 0.1-0.37 | | Pressing force value | 146 ± 6% | | N/A |

In the foregoing, only the structure in this embodiment is used as an example for description, and this is not intended to limit the present disclosure.

It should be understood that in this embodiment of the present disclosure, "B corresponding to A" indicates that B is associated with A and B may be determined based on A. However, it should be further understood that determining B based on A does not mean that B is determined based on only A, but also means that B may be further determined based on A and/or other information.

In addition, the term "and/or" in the present disclosure is merely used to describe an association relationship between associated objects, and represents that three relationships may exist. For example, A and/or B may represent the following three cases: Only A exists, both A and B exist, and only B exists. In addition, the character "/" in the present disclosure usually represents an "or" relationship between the associated objects.

A person of ordinary skill in the art may be aware of that, with reference to the units and algorithm steps in the examples described in the disclosed embodiments of the present disclosure, the present disclosure may be implemented in the form of electronic hardware or a combination of computer software and electronic hardware. Whether these functions are implemented with hardware or software depends on particular application and design constraints of the technical solution. A person skilled in the art may implement the described functions using different methods for each particular application, but such implementation should not be considered beyond the scope of the present disclosure.

It may be clearly understood by a person skilled in the art that, for the purpose of convenient and brief description, for a detailed operating process of the foregoing system, apparatus, and unit, refer to a corresponding process in the foregoing method embodiment, and details are not described herein.

In the embodiments provided in the present disclosure, it should be understood that the disclosed system, apparatus, and method may be implemented in other manners. For example, the apparatus embodiment described above is merely an example. For example, the unit division is merely logical function division. In actual implementation, there may be another division manner. For example, a plurality of units or components may be combined or integrated into another system, or some features may be ignored or not performed. In addition, the displayed or discussed mutual coupling, direct coupling, or communication connection may be indirect coupling or communication connection through some interfaces, apparatuses, or units, or may be in an electrical, mechanical, or other form.

The units described as separate parts may or may not be physically separate, and parts displayed as units may or may not be physical units, may be located in one position, or may be distributed on a plurality of network units. Some or all units may be selected according to actual needs, to achieve objectives in the solution of this embodiment.

In addition, functional units in the embodiments of the present disclosure may be integrated into one processing unit, each of the units may exist alone physically, or two or more units are integrated into one unit.

It should be understood that specific examples in the embodiments of the present disclosure are merely to help a person skilled in the art better understand the embodiments of the present disclosure, but not to limit the scope of the embodiments of the present disclosure. A person skilled in the art may perform various improvements and variations on the basis of the foregoing embodiments, and these improvements or variations fall within the protection scope of the present disclosure.

The foregoing descriptions are merely specific implementations of the present disclosure, but are not intended to limit the protection scope of the present disclosure. Any variation or replacement readily figured out by a person skilled in the art within the technical scope disclosed in the present disclosure shall fall within the protection scope of the present disclosure. Therefore, the protection scope of the present disclosure shall be subject to the protection scope of the claims.

What is claimed is:

1. A touchpad, comprising: a circuit board and a support assembly, wherein the circuit board comprises a touch sensor and a travel switch, and the touch sensor is configured to implement a touch sensing function of the touchpad; and the support assembly is disposed below the circuit board, and the support assembly comprises a fixed platform configured to fixing the touchpad to a housing of an electronic device, the fixed platform comprising a boss;

wherein the boss on the fixed platform is configured to touch and trigger the travel switch when the touchpad is pressed.

2. The touchpad according to claim 1, wherein the support assembly further comprises:

a main support component, wherein the main support component is disposed at an edge of a bottom surface of the circuit board; and a first elastic component and a second elastic component, wherein the first elastic component and the second elastic component are symmetrically connected to the main support component along a plane in which the main support component is located, and an opening for accommodating the fixed platform is formed between the first elastic component and the second elastic component.

3. The touchpad according to claim 2, wherein the support assembly further comprises: a first connecting component and a second connecting component; and the first connecting component and the second connecting component are respectively attached to the first elastic component and the second elastic component.

4. The touchpad according to claim 3, wherein pressure point grooves are disposed on both sides of the support assembly, to control flatness of the support assembly.

5. The touchpad according to claim 4, wherein the pressure point grooves are disposed on both sides of the main support component, the fixed platform, the first elastic component, the second elastic component, the first connecting component, and the second connecting component for controlling flatness of the support assembly.

6. The touchpad according to claim 5, wherein depths of the pressure point grooves on the main support component are 0.06 mm to 1 mm, depths of the pressure point grooves on the fixed platform are 0.04 mm to 0.08 mm, depths of the pressure point grooves on the first elastic component and the second elastic component are 0.02 mm to 0.05 mm, and depths of the pressure point grooves on the first connecting component and the second connecting component are 0.04 mm to 0.08 mm.

7. The touchpad according to claim 6, wherein the main support component is controlled to has a degree of flatness of less than 0.15 mm by disposing the pressure point grooves, and the fixed platform is controlled to has a degree of flatness of less than 0.05 mm by disposing the pressure point grooves.

8. The touchpad according to claim 3, wherein the first elastic component and the second elastic component are connected to the main support component through cantilever beams.

9. The touchpad according to claim 8, wherein the first elastic component and the second elastic component are connected to the fixed platform through cantilever beams.

10. The touchpad according to claim 9, wherein the first elastic component comprises a first elastic arm and a second elastic arm disposed transversely, and a first main body portion disposed longitudinally along the plane in which the main support component is located, wherein the first main body portion is connected between the first elastic arm and the second elastic arm; and the second elastic component comprises a third elastic arm and a fourth elastic arm disposed transversely, and a second main body portion disposed longitudinally along the plane in which the main support component is located, wherein the second main body portion is connected between the third elastic arm and the fourth elastic arm.

11. The touchpad according to claim 10, wherein the first connecting component has a first main body support part, a first support arm, and a second support arm, wherein the first main body support part is configured to reinforce the first main body portion, the first support arm is configured to reinforce the first elastic arm, and the second support arm is configured to reinforce the second elastic arm; and the second connecting component has a second main body support part, a third support arm, and a fourth support arm, wherein the second main body support part is configured to reinforce the second main body portion, the third support arm is configured to reinforce the third elastic arm, and the fourth support arm is configured to reinforce the fourth elastic arm.

12. The touchpad according to claim 11, wherein the first support arm has a first protruding portion, the first protruding portion extends to an area where the third elastic arm is disposed to enable the first support arm and the third elastic arm to partially overlap each other, the third support arm has a third protruding portion, the third protruding portion extends to an area where the first elastic arm is disposed to enable the third support arm and the first elastic arm to partially overlap each other, and the first protruding portion and the third protruding portion do not interfere with each other; and the second support arm has a second protruding portion, the second protruding portion extends to an area where the fourth elastic arm is disposed to enable the second support arm and the fourth elastic arm to partially overlap each other, the fourth support arm has a fourth protruding portion, the fourth protruding portion extends to an area where the second elastic arm is disposed to enable the fourth support arm and the second elastic arm to partially overlap each other, and the second protruding portion and the fourth protruding portion do not interfere with each other.

13. The touchpad according to claim 10, wherein the first elastic arm is butted with the third elastic arm, the second elastic arm is butted with the fourth elastic arm, a first gap exists between the first elastic arm and the third elastic arm and between the second elastic arm and the fourth elastic arm.

14. The touchpad according to claim 2, wherein the main support component has a first border and a second border that are opposite to each other, the first border is connected to the first elastic component, an opening is disposed in the middle of the first border to cut off the first border, the second border is connected to the second elastic component, and an opening is disposed in the middle of the second border to cut off the second border.

15. The touchpad according to claim 2, wherein a touch assembly disposed on the support assembly comprises a cover plate and the circuit board, the cover plate is connected to the circuit board by using a fixing glue for the cover plate, and the circuit board is connected to the main support component by using an adhesive tape.

16. The touchpad according to claim 15, wherein the adhesive tape is a double-sided foam tape.

17. The touchpad according to claim 1, wherein a center pressing column in contact with the boss on the fixed platform is disposed on the travel switch, and when a touch assembly disposed on the support assembly is not pressed, the center pressing column and the boss interfere with each other.

18. The touchpad according to claim 1, wherein the support assembly has a sheetlike structure.

19. The touchpad according to claim 1, wherein the boss is integrally formed on the fixed platform.

20. An electronic device, comprising:
a touchpad, comprising a circuit board and a support assembly, wherein
the circuit board comprises a touch sensor and a travel switch, and the touch sensor is configured to implement a touch sensing function of the touchpad;
the support assembly is disposed below the circuit board, and the support assembly comprises a fixed platform configured to fixing the touchpad to a housing of the electronic device, wherein the fixed platform comprises a boss, and the boss on the fixed platform is configured to touch and trigger the travel switch when the touchpad is pressed; and
the housing, wherein the touchpad is fixedly mounted in the housing.

* * * * *